(12) United States Patent
Raman et al.

(10) Patent No.: US 9,928,310 B2
(45) Date of Patent: Mar. 27, 2018

(54) IN-MEMORY GRAPH PATTERN MATCHING

(71) Applicant: Oracle International Corporation, Redwood Shores, CA (US)

(72) Inventors: Raghavan Raman, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 853 days.

(21) Appl. No.: 14/461,184

(22) Filed: Aug. 15, 2014

(65) Prior Publication Data

US 2016/0048607 A1 Feb. 18, 2016

(51) Int. Cl.
*G06F 17/30* (2006.01)

(52) U.S. Cl.
CPC .. *G06F 17/30958* (2013.01); *G06F 17/30979* (2013.01)

(58) Field of Classification Search
None
See application file for complete search history.

(56) References Cited

U.S. PATENT DOCUMENTS

| | | | |
|---|---|---|---|
| 8,059,602 B2 | 11/2011 | Kim | |
| 8,180,804 B1 * | 5/2012 | Narayanan | G06F 17/30867 707/798 |
| 8,185,558 B1 * | 5/2012 | Narayanan | G06F 17/30958 707/798 |
| 8,572,129 B1 * | 10/2013 | Lee | G06F 17/30861 707/798 |
| 8,606,774 B1 | 12/2013 | Makadia | |
| 8,606,787 B1 | 12/2013 | Asgekar | |
| 8,909,646 B1 | 12/2014 | Fabrikant | |
| 9,236,885 B2 | 1/2016 | Shokrollahi | |
| 2002/0075263 A1 | 6/2002 | Kato | |
| 2002/0193981 A1 | 12/2002 | Keung | |
| 2005/0028148 A1 | 2/2005 | Civlin | |

(Continued)

OTHER PUBLICATIONS

Shang et al., "Taming Verification Hardness: An Efficient Algorithm for Testing Subgraph Isomorphism", VLDB '08, Aug. 2008, 12 pages.

(Continued)

*Primary Examiner* — Christopher J Raab
(74) *Attorney, Agent, or Firm* — Hickman Palermo Becker Bingham LLP; Daniel D. Ledesma

(57) ABSTRACT

Techniques for identifying, in a target graph, subgraphs that match a query graph are provided. Processing a query graph comprises multiple stages, one for each query node in the query graph. In the first stage, a query node is selected, different portions of the target graph are assigned to different threads, each thread identifies nodes that match the selected query node and stores the identities of those nodes in storage that is local to the thread. The results of each thread are then stored in a "global" data structure. In the second stage, a second query node is selected and different portions of the global data structure are assigned to different threads. Each thread identifies nodes that match the second query node and that are connected to a previously-matched node. The second stage repeats until all nodes in the query graph are processed.

22 Claims, 5 Drawing Sheets

(56) References Cited

U.S. PATENT DOCUMENTS

| | | | |
|---|---|---|---|
| 2007/0192451 A1 | 8/2007 | Tran | |
| 2008/0256057 A1 | 10/2008 | Riise | |
| 2010/0082545 A1 | 4/2010 | Bhattacharjee | |
| 2011/0016460 A1 | 1/2011 | Archambault | |
| 2012/0096043 A1* | 4/2012 | Stevens, Jr. | G06F 17/30958 707/798 |
| 2012/0259915 A1 | 10/2012 | Bhatt | |
| 2012/0317149 A1 | 12/2012 | Jagota | |
| 2014/0032617 A1* | 1/2014 | Stanfill | G06F 17/30557 707/809 |
| 2014/0214936 A1* | 7/2014 | Abraham | H04W 4/206 709/204 |
| 2014/0229510 A1 | 8/2014 | Yu | |
| 2014/0244687 A1* | 8/2014 | Shmueli | G06F 17/30587 707/780 |
| 2014/0282455 A1 | 9/2014 | Felch | |
| 2015/0146655 A1 | 5/2015 | Hui | |
| 2015/0178405 A1 | 6/2015 | Hong et al. | |
| 2015/0178406 A1 | 6/2015 | Hong et al. | |

OTHER PUBLICATIONS

Neo4j Graph Database, "What is a Graph Database?", http://neo4j.com/developer/graph-database/, last viewed on May 6, 2015, 7 pages.

Lee et al., "An In-depth Comparison of Subgraph Isomorphism Algorithms in Graph Databases", Proceedings of the VLDB Endowment, vol. 6, No. 2, dated 2012, 12 pages.

http://www.w3.org/TR/2014/NOTE-rdf11-primer-20140624/, dated 2014, RDF 1.1 Primer W3C Working Group Note Jun. 24, 2014, 15 pages.

http://docs.oracle.com/database/121/RDFRM/toc.htm, dated 2014, Oracle Help Center, Spatial and Graph RDF Semantic Graph Developer's Guide—Contents, 2 pages, last viewed May 20, 2015.

http://ceur-ws.org/Vol-301/Paper_5_Erling.pdfm, dated 2007, Erling et al., RDF Support in the Virtuoso DBMS, 10 pages.

Han et al., Turbo: Towards UltraFast and Robust Subgraph Isomorphism Search in Large Graph Databases http://wshan.net/sigmod2013/p337-han.pdf, dated Jun. 2013, 12 pages.

Cordella et al., "A (Sub) Graph Isomorphism Algorithm for Machine Large Graphs", IEEE Transactions on Pattern Analysis and Machine Intelligence, vol. 26, No. 10, dated Oct. 2004, 6 pages.

https://github.com/tinkerpop/blueprints/wiki/Property-Graph-Model, GitHub, "Property Graph Model" dated Jun. 13, 2012, 2 pages.

http://www.w3.org/TR/rdf-sparql-query/, SPARQL Query Language for RDF, W3C Recommendation Jan. 15, 2008, 90 pages.

U.S. Appl. No. 14/139,269, filed Dec. 23, 2013, Office Action dated Oct. 15, 2015.

Ziv Bar-Yossef et al., "Reduciton in Streaming Algorithms with an Application to Counting Triangles in Graphs", Proceedings SODA, dated 2002 ACM, pp. 623-632.

Seshadhri et al., Fast Triangle Counting through Wedge Sampling, Proceedings of the SIAM Conference on Data Mining. vol. 4, dated 2013, 9 pages.

Hossein et al., "New Streaming Algorithms for Counting Trangles in Graphs", Computing and Combinatorics, vol. 3595 of the series Lecture Notes in Computer Sciences dated 2005, pp. 710-716.

Buriol et al., "Counting Triangles in Data Streams", ACM, dated 2006, pp. 253-262.

Hong, U.S. Appl. No. 14/139,237, filed Dec. 23, 2013, Office Action dated Apr. 7, 2017.

U.S. Appl. No. 14/139,269, filed Dec. 23, 2013, Notice of Allowance dated Feb. 3, 2016.

U.S. Appl. No. 14/139,237, filed Dec. 23, 2013, Office Action dated Mar. 24, 2016.

U.S. Appl. No. 14/139,237, filed Dec. 23, 2013, Final Office Action dated Jul. 22, 2016.

U.S. Appl. No. 14/139,237, filed Dec. 23, 2013, Final Office Action dated Aug. 11, 2017.

* cited by examiner

IN-MEMORY GRAPH PATTERN MATCHING

CROSS-REFERENCE TO RELATED APPLICATIONS

This application is related to U.S. application Ser. Nos. 14/139,237 and 14/139,269, both filed Dec. 23, 2013, the entire contents of each which are hereby incorporated by reference as if fully set forth herein.

FIELD OF THE DISCLOSURE

The present disclosure relates generally to query graph processing and, more specifically, to efficiently finding, in a graph, subgraphs that match a query graph.

BACKGROUND

Graph pattern matching, also known as "subgraph isomorphism," is becoming a problem of significant interest, as the growth in graph databases has increased. It is important to use a fast solution to this problem, which involves finding all (or some) subgraphs of a graph D (the data graph) that are isomorphic to another graph Q (the query graph). Although the general problem of subgraph isomorphism is NP-Hard ("Non-deterministic Polynomial-time hard"), the actual instances of this problem are tractable in practical contexts, because nodes and edges are associated with unique identifiers and/or a set of properties in popular graph data models.

Multiple solutions have been proposed for subgraph isomorphism. In one solution, a graph database adopts the classic RDF graph data model and SPARQL, a query language for RDF data. When a SPARQL query is submitted, an RDF database finds all matching subgraphs and graph elements of the query, by solving the subgraph isomorphism problem. Similar pattern-matching operations are also supported by graph databases that adopt the more recent Property Graph (PG) data model. Noticeably, these graph databases are all based on secondary storage so that they can process very large graphs. However, such secondary storage based solutions are much slower than in-memory solutions due to the huge overhead from the storage layer.

In contrast, in-memory solutions exist for this problem. However, most of these solutions are single-threaded and are not easily parallelizable due to their respective complexity. In addition, these solutions do not handle large-sized graphs very well on shared-memory multi-processor systems because those solutions rely on data representations that have large memory footprints.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
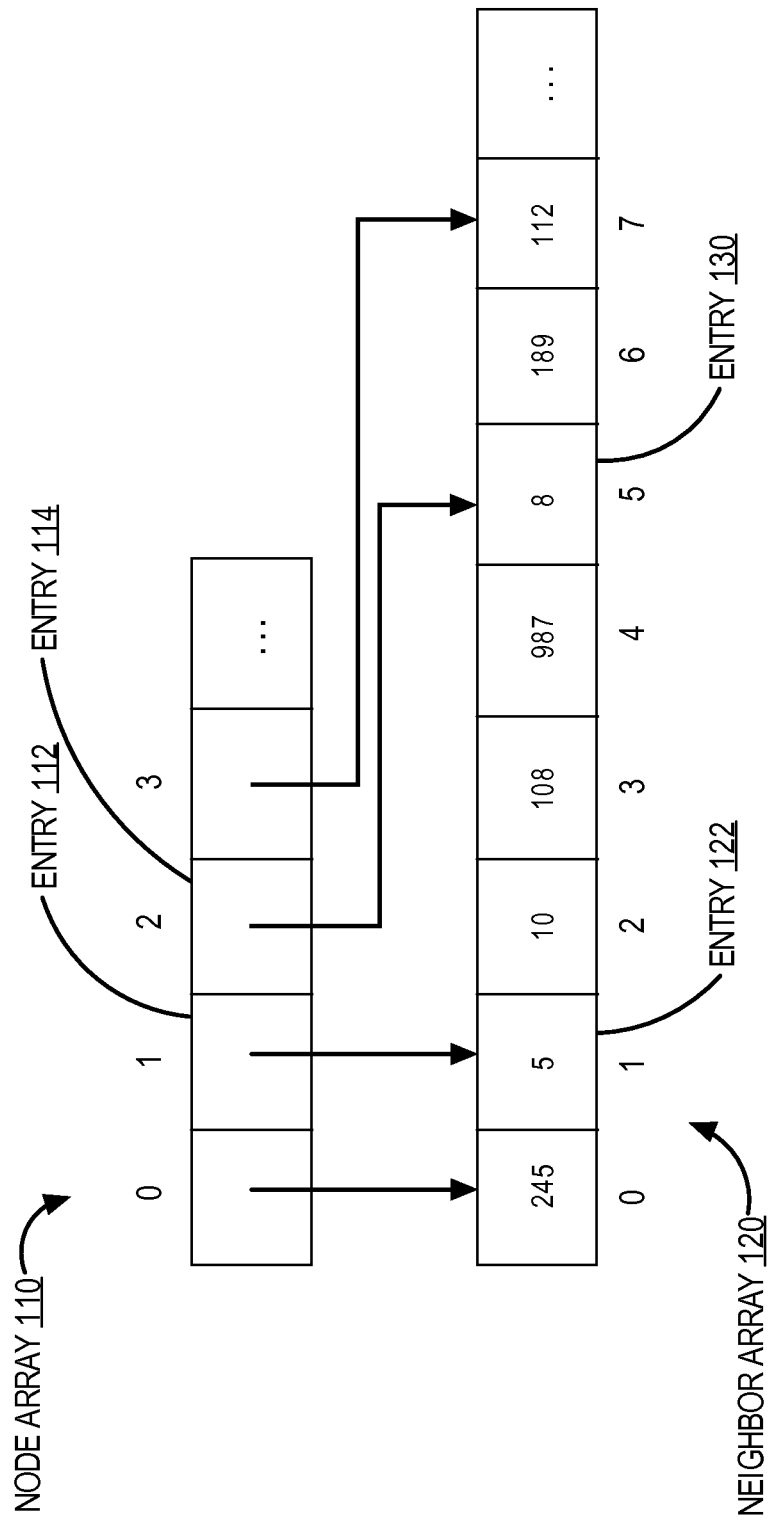
FIG. 1 is a block diagram that depicts an in-memory representation of a node or target graph, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for efficiently identifying, within a target graph, multiple (or all) subgraphs that match a query graph. The techniques involve a breadth-first search matching approach. In one technique, the first stage of processing the query graph involves identifying nodes (in the target graph) that match a first query node (i.e., of the query graph). This first stage is performed in parallel by multiple threads, each assigned to a different subset of the target graph. Each thread stores identities of nodes that match the first query node in a separate (or "thread-local") data structure, such as an array. Each thread then stores its respective (i.e., intermediate or partial) results in single ("global") data structure, such as an array. The nodes identified in the global data structure represent the partial results after the first stage.

The second stage involves each thread being assigned a different subset of the global data structure and identifying, in the target graph, nodes that match a second query node and that are connected to one of the previously matched nodes assigned to that thread. Each thread stores its results (including identities of the previously-matched nodes assigned to the thread) in a different thread-local data structure. Each thread then stores its respective (i.e., intermediate or partial) results in a global data structure that is accessible to all the threads.

The second stage repeats until all the query nodes of the query graph have been processed. The global data structure at the end of the last stage represents a result of processing the query graph.

Due to the compact nature of the representation of a graph and the increasing size of computer memories, the techniques described herein may be performed once the entire graph is loaded into memory. However, the techniques may also be performed without having a graph entirely in memory. Instead, parts of a graph may be loaded into memory when those parts are needed. Such an approach may be followed if the memory of a computing device is unable to store the entire graph in memory at once.

Graph

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

Also, node and edges may have attributes or properties. For example, if a node represents a person in a social graph, then the node may have a name attribute, an age attribute, a residence attribute, one or more interest attributes, an employment status attribute, etc. As another example, if an edge represents a relationship between two people, then an edge may have a type attribute (e.g., parent, spouse, sister, employer, friend, etc.) and a direction attribute, which may indicate whether one node of an edge "follows" another node of the edge or which direction data flows.

When a graph is stored in memory (whether volatile or non-volatile or both), the names of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, while a process that implements techniques described herein for identifying, in a graph, multiple subgraphs that match a query graph, such converted values may be later mapped back to the respective original values that identify (or are associated with) real-world objects, such as an email address, IP address, MAC address, or social network account identifier.

System Overview

Embodiments described herein may be implemented on a single computing device or multiple computing devices. For example, a single computing device may have enough memory to store graph data that indicates multiple nodes and their respective edges and to perform determinations, such as, given a query graph, identify, within a target graph, multiple subgraphs that match the query graph.

As another example, multiple computing devices may be networked to allow different computing devices to analyze different portions of a graph. For example, computing device A analyzes the edges (or neighbors) of nodes 1-100 while computing device B analyzes the edges (or neighbors) of nodes 101-200.

Query Graph

A user formulates and submits a query that requests identification of multiple (or all) subgraphs (in a graph) that match a particular graph, referred to herein as a "query graph." A query graph comprises multiple ("query") nodes and specifies one or more node attributes (or properties) of one or more of the query nodes and/or one or more edge attributes (or properties) of one or more edges ("query edges") in the query graph. The type of node attributes depends on the type of nodes. For example, if a node represents a person in a social graph, then node attributes may include age, gender, residence, previous/current employers, interests, etc. If a node represents a computing device in an enterprise network, then node attributes may include MAC address, department, operating system, number of hardware processors, installed applications, etc.

An example query graph is one that requests identification of all males that reside in San Francisco that have been to Europe and have a friend who resides in Europe, where both have an interest in soccer. The query graph would comprises two nodes where (1) the attributes of one node are male, resides in San Francisco, traveled to Europe, and likes soccer, (2) the attributes of the other node are resides in Europe and likes soccer, and (3) both nodes are connected to each other. A graph query engine then analyzes a social graph that comprises thousands or millions of nodes to identify all instances of the query graph (or subgraphs that match the query graph) in the social graph.

Embodiments are not limited to any particular type of query graph or target graph. For example, a target graph may be based on the Resource Description Framework (RDF) data model or the Property Graph (PG) data model. Example query languages in which a query graph may be specified include the Simple Protocol and RDF Query Language (SPARQL) query language and Cypher.

The following is an example of a query graph:

```
PREFIX rdf: <http://www.w3.org/1999/02/22-rdf-syntax-ns#>
PREFIX ub: <http://www.lehigh.edu
/-zhp2/2004/0401/univ-bench.owl#>
IN lubm50
MATCH
    X -[ub:memberOf]->Z,
    Z -[ub:subOrganizationOf]->Y,
    X -[ub:undergraduateDegreeFrom] ->Y,
    X.rdf:type == ub:GraduateStudent,
    Y.rdf:type == ub:University,
    Z.rdf:type == ub:Department
IN ORDER X, Y, Z
SELECT AS TABLE
    X, Y, Z
```

This example query graph requests subgraphs, in graph "lubm50", where a graduate student is a member of a department that is a sub organization of a university, where the graduate student obtained an undergraduate degree from that university. The example query graph also specifies that the nodes in the graph that match graduate student nodes are to be identified first, followed by nodes that match university nodes, followed by nodes that match department nodes.

In-Memory Representation of a Graph

A graph (i.e., that is being analyzed to identify subgraphs that match a query graph) may be represented in memory in any number of ways. Embodiments are not limited to any particular representation. FIG. 1 is a block diagram that depicts two arrays: a node array 110 and a neighbor array 120, in an embodiment. Each entry in node array 110 corresponds to a different node in a graph and includes a value (e.g., an index, a reference, or a pointer) that is used to identify an entry in neighbor array 120. For example, if a user of a social networking service has 1029 friends (or registered contacts) and a node in node array 110 corresponds to that user, then neighbor array 120 would include 1029 entries, one for each "friend" of the user.

The "pointed-to" entry in neighbor array 120 that is "pointed to" by a "pointing" entry in node array 110 indicates that the node represented by the "pointed-to" entry is a "neighbor" of the node represented by the "pointing" entry. For example, entry 112 in node array 110 may include an index value (e.g., '1') that corresponds to entry 122 in neighbor array 120. Thus, with respect to entry 122, entry 112 is a "pointing" entry. Entry 112 is the second position in node array 110. If each node in a graph (that comprises N nodes) is given a unique value from 0 to N−1, then entry 112 corresponds to node '1' which can be used to index into node array 110 at the second position. Entry 122 includes the value '5', indicating that it can be used to index into node array 110 at the sixth position.

The neighbors of a particular node indicated in node array 110 may be determined based on (1) the "pointed-to" entry (in neighbor array 120) that the "pointing" node indicates (or references) and (2) the entry (in neighbor array 120) that the node subsequent to the "pointing" node in node array 110 indicates (or references). For example, entry 112 indicates (or references) entry 122 in neighbor array 120. Entry 114 indicates (or references) entry 130. All entries between entry 122 and entry 130 (including entry 122 and excluding entry 130) are neighbors of entry 112. Thus, the neighbors of the node indicated by entry 112 are nodes 5, 10, 108, and 987.

The set of neighbors that are indicated in neighbor array 120 and that correspond to a particular node in node array 110 is referred to herein as the "neighbor list" of the particular node. Each neighbor list is indicated by a contiguous set of entries in neighbor array 120.

In a related embodiment, an entry in node array 110 includes two values that are used to identify neighbors of the entry. For example, entry 112 may include the values '1' and '4'. The neighbor list of entry 112 may then be determined as the nodes between (and including) the second entry and the fifth entry in neighbor array 120.

In an embodiment, an in-memory representation of a graph comprises one or more additional data structures to store information about attributes of nodes and/or attributes of edges in the graph. For example, if a node can have up to four attributes, then four arrays that are the same size as node array 110 (and in the same order) may be generated and stored. As another example, a single node attribute array may be generated and stored where each entry in the node attribute array stores multiple attributes of a corresponding node in node array 110. In either example, a particular position in a node attribute array (e.g., the $4^{th}$ position) would store one or more attributes of the node identified in the same position (e.g., the $4^{th}$ position) in node array 110.

Similarly, one or more edge attribute arrays may be generated and stored, each edge attribute array being the same size as neighbor array 120 and storing one or more attributes of a corresponding edge in neighbor array 120.

Alternatively, each entry in node array 110 may be configured to not only store data that identifies one or more positions in neighbor array 120, each entry in node array 110 may also be configured to store one or more attributes of the corresponding node. Similarly, each entry in neighbor array 120 may also be configured to store one or more edge attributes (or properties) of the corresponding edge from a node in node array 110 to the node that corresponds to the entry in neighbor array 120.

As noted previously, an edge attribute may indicate a direction. For example, entry 122 may store data that indicates that the edge from the node corresponding to entry 112 points to the node corresponding to entry 122 while the third entry in neighbor array 120 may store data that indicates that the edge from the node corresponding to entry 112 is pointed to by the node corresponding to the third entry.

Processing a Query Graph

Figure 2A:
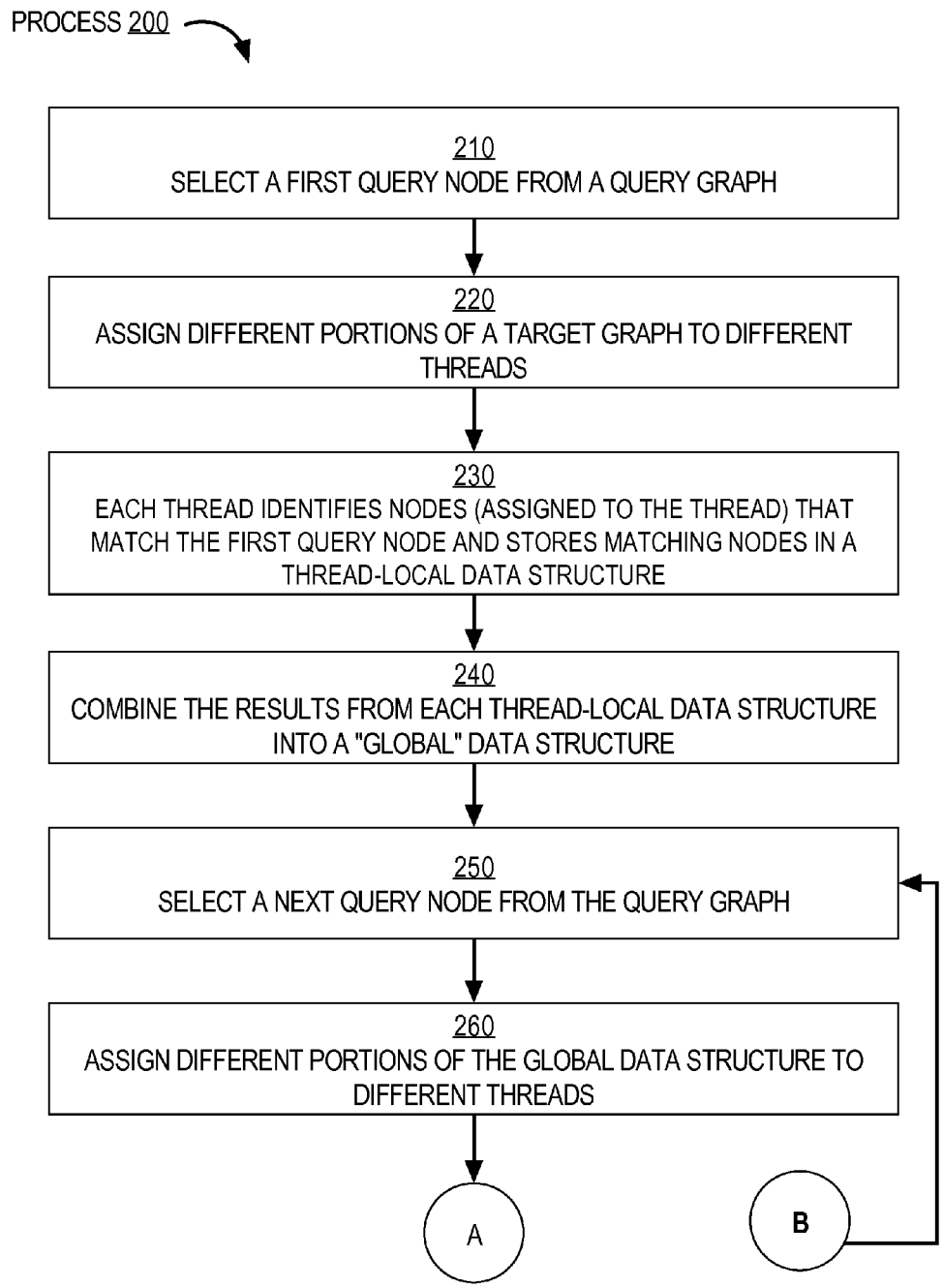
FIGS. 2A-2B are flow diagrams that depict a process for identifying, within a target graph, subgraphs that match a query graph, in an embodiment.
Figure 2B:
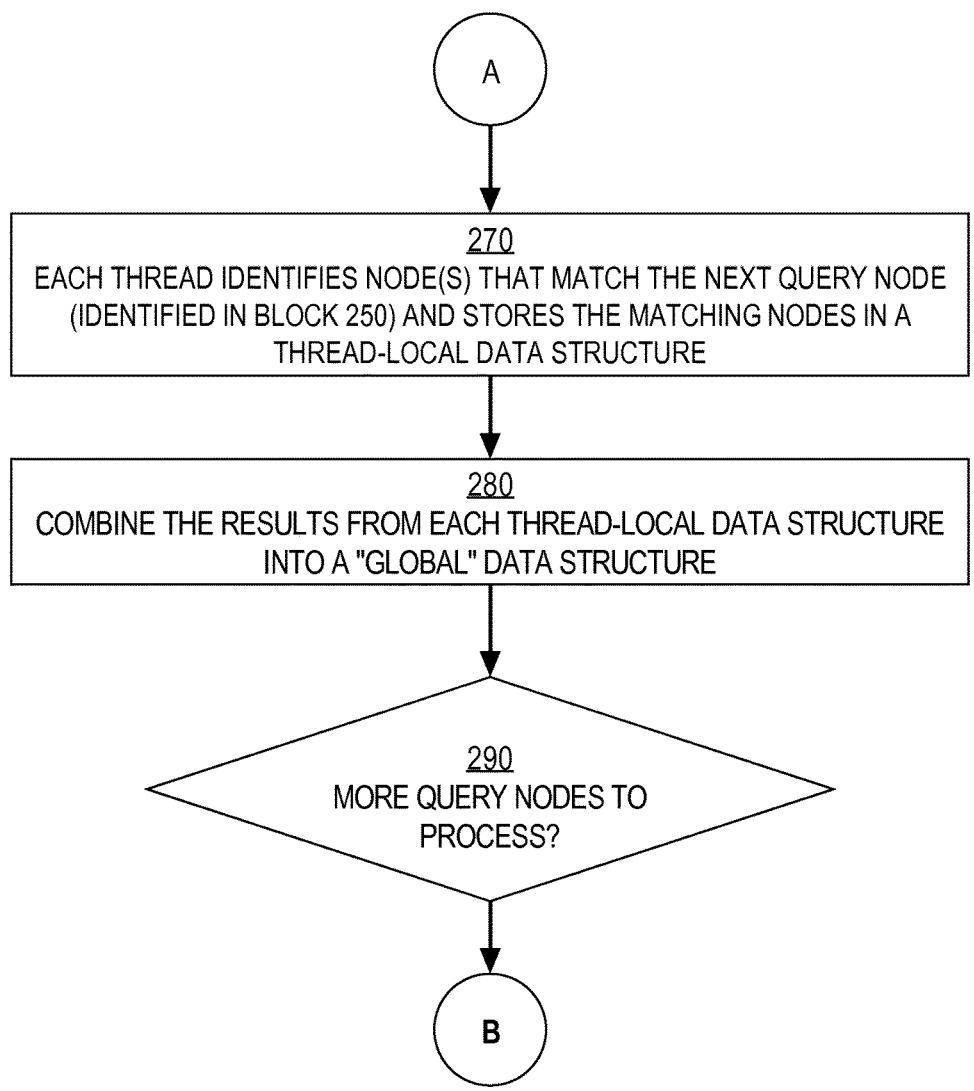

In an embodiment, a query graph is processed in a parallel fashion using a breadth-first search of the target graph. A breadth-first search involves multiple phases, each phase corresponding to a different node in the query graph. Thus, if a query graph includes four nodes, then the breadth-first search involves four phases. Because a query graph includes at least two nodes, a breadth-first search will involve at least two phases. FIGS. 2A-2B are flow diagrams that depict a process 200 for identifying, within a target graph, subgraphs that match a query graph, in an embodiment. Process 200 may be performed by a query execution engine that receives and processes a query graph. A processed query graph may be a query graph that is formed by a user or may be the result of one or more query transformations that have been applied to an original query graph. In the latter scenario, either the query execution engine performed the query transformation(s) or another component performed the query transformation(s) before the execution engine executes the query graph.

At block 210, as part of the first phase, a first node in the query graph is selected. Any of the nodes in the query graph may serve as the initial node in the breadth-first search. Thus, the first node may be selected randomly. Alternatively, the first node selected may be one that is associated with the most attributes, which may be an indication of being the most selective. In other words, the first phase may result identifying fewer nodes if the node with the most attributes is selected than if the node with the least attributes is selected. Because fewer nodes may be selected in the first phase, fewer nodes may be identified in the second phase, and so forth.

At block 220, as part of the first phase, after a first node in the query graph is selected, the target graph is divided among a plurality of parallel threads. For example, if there are eight parallel threads and 80,000 nodes in the target graph, then each thread is assigned to a different set of 10,000 nodes. If the target graph is represented in memory using node array 110 and neighbor array 120, then a first thread is assigned to the first 10,000 nodes in node array 110, a second thread is assigned to the second 10,000 nodes in node array 110, and so forth.

At block 230, as part of the first phase, each thread analyzes the nodes (and any attributes of those nodes) that are assigned to the thread to identify nodes in the target graph that match the first node that was selected in the query graph (i.e., in block 220). Each thread may be performed in parallel.

Block 230 may involve, for each node assigned to a thread, comparing the first selected node's attribute(s) to the corresponding attribute(s) of the assigned node. If the attribute(s) match, then the assigned node (i.e., from the target graph) is considered a "matching node."

Block 230 also involves storing the identity of each matching node from the target graph in a separate data structure, such as an array. For example, a first thread identifies 23 nodes and stores a node ID for each of the 23 nodes in a first array while a second thread identifies 18 nodes and stores a node ID for each of the 18 nodes in a second array that is different than the first array. Such arrays are referred to as "thread-local" arrays because each array is only written to by a single thread. Because each thread writes to a different data structure, this portion of block 230 may also be performed in parallel.

Other subgraph matching algorithms store a pair of nodes (u, v) for every query node u in their partial solutions, where v is the data node that matches u. The pair is necessary because, in general, the other subgraph matching algorithms can match the query nodes in any order. In embodiments, however, the matching order of query nodes is fixed, allowing the query nodes to be omitted. Instead, embodiments store only the identities of nodes (i.e., from the target graph) in partial solutions. The position of the matched node in a partial solution corresponds to the query node to which the matched node matches. Such a representation reduces the memory usage of partial solutions by half, which may be very useful, especially if a query graph results in millions of partial solutions.

At block 240, the node identities in the different data structures are combined into a single data structure (or "shared data structure"), such as an array. Continuing with the example above, the first thread stores the node ID of each of the 23 nodes in the first 23 positions in a particular array, the second thread stores the node ID of each of the 18 nodes in the second 18 positions in the particular array. Such an array is considered a "global array" because multiple threads are able to write to that array.

Copying the node identities to the shared data structure may be performed using one of multiple techniques. In one technique, each thread has access to order data that indicates an order to the parallel threads. Thus, one thread "knows" (based on the order data) that it is the first thread while another thread "knows" (based on the order data) that it is the fifth thread. In a first way, the first thread copies node identities from the first thread's data structure to the shared data structure. The first thread then notifies (e.g., by setting a flag) the second thread, which determines the next available entry in the shared data structure and copies node identities from the second thread's data structure to the shared data structure, beginning at the next available entry. This procedure continues until all the threads have copied their respective node identities into the shared data structure.

In another technique, each parallel thread does not have to wait for the preceding one to copy its node identifies into the shared data structure. Instead, each thread, except for the first thread, determines a position in the shared data structure to begin copying node identities based on the number of node identities in the data structure(s) of earlier-ordered threads. For example, the second thread (in the order) determines that the number of node identities in the first thread's data structure is 23. Therefore, the second thread determines that it may copy its node identities beginning at the $24^{th}$ position in the shared data structure. Continuing with this example, the third thread determines that the number of node identities in the second thread's data structure is 18 and that the number of node identities in the first thread's data structure is 23. Therefore, the third thread determines that it may copy its node identities beginning at the $42^{nd}$ position in the shared data structure. In this technique, block 240 may be performed in parallel.

The shared data structure stores node identities of (e.g., all) nodes, in the target graph, that match the first selected node in the query graph.

If partial solutions remained stored in separate thread-local data structures, then a large number of very small data structures would be created, resulting in poor performance. To avoid this problem, block 240 involves storing all partial solutions "inlined" in one large data structure (i.e., the "global data structure"). This data structure is compact because it reserves space to store only the nodes that have been matched so far. For example, if there are K partial solutions at the end of the first stage, then the global data structure is just large enough to store K elements. Similarly, if there are K partial solutions at the end of the second stage, then the global data structure is just large enough to store K*2 elements. The inlined representation in a single array also provides more spatial locality while iterating over the partial solutions.

If each partial solution is stored in a separate array, then spatial locality would be lost. For example, if a cache line is large enough to hold three partial solutions, then, when a thread reads the first partial solution, the read will result in a full cache line (including all three partial solutions) being brought into the cache. Thus, the second and third partial solutions can be read from the cache directly thereafter. If, instead, each partial solution is stored in a separate array, then, when a thread brings in a new cache line, the thread must bring in a new cache line for each partial solution, resulting in no spatial locality.

At block 250, after all the node identities that were identified in block 230 are stored in the shared data structure in block 240, the second phase begins. Block 250 is similar to block 210 in that another node is selected from the query graph. In the first performance of block 250 (which may be performed multiple times if there are more than two nodes in the query graph), the second node that is selected in the query graph may be a node that is connected to (or have a relationship with) the first selected node in the query graph. Alternatively, the second selected node may not be connected to the first selected node. In this case, node array 110 would again divided among the multiple threads. However, since the first stage should have identified relatively few nodes (e.g., less than half of all the nodes in the target graph) that match the first selected node from the query graph, identifying a query node that is connected to the first selected query node would be more prudent. However, there is no guarantee that the matched nodes will be significantly less than all the nodes in the data graph, such as half. There may be no such restriction on the matching criteria. In the worst case, all the nodes in the data graph might match the first query node.

At block 260, after the second node in the query graph is selected, the shared data structure (at the end of block 240) is divided among multiple parallel threads, which maybe the same threads that were used in blocks 220-240 (i.e., during the first phase). For example, if there are eight threads and eight hundred node identities in the shared data structure, then each thread is assigned a different set of one hundred node identities from the shared data structure.

At block 270, (similar to block 230), a matching step is performed. At every stage (starting with the second stage), the matching step of block 270 involves looking for a node that (1) is connected to an already matched node X and (2) matches a query node Q. In the second stage, for a particular thread, the particular thread identifies a matched node X (assigned to the particular thread from the shared data structure) and identifies a query node Q, which is the second selected query node (i.e., selected in block 250). The matching step involves iterating over all the edges from matched node X and the corresponding neighbors of matched node X looking for matches with the corresponding edge and neighbor in the query graph. Such matching may be done in two different ways. (If, at the second or subsequent stage, a query node that is not connected to a previously-selected query node was selected, then this matching step would not be used. Instead, the matching step of block 230 would be used. However, additionally, at some point later during matching, two sets of partial solutions would need to be merged, which would involve an expensive "join".)

In a "node-first" approach, a neighbor of matched node X is first matched with query node Q and then the edge from matched node X is matched with the query edge. For example, the node corresponding to entry 112 (of node array 110, depicted in FIG. 1) matches a first selected query node from a query graph. Then, the neighbors of that node (with an ID of '1', which indicates the position in node array 110) are considered. First, the attribute(s) of the node corresponding to entry 122 are compared to the attribute(s) of the second selected query node from the query graph. If the two nodes match, then the attribute(s) of the edge from the node corresponding to entry 112 to the node corresponding to entry 122 are compared to the attribute(s) (if any) of the corresponding edge (in the query graph) from the first selected query node to the second selected query node. These two comparisons are performed for each neighbor of the node corresponding to entry 112 (i.e., nodes '5', '10', '108', and '987').

In an "edge-first" approach, the edge from matched node X is first matched with the query edge and then the neighbor of matched node X is matched with query node Q. For example, the node corresponding to entry 112 (of node array 110, depicted in FIG. 1) matches a first selected query node from a query graph. Then, the edges of that node (with an ID of '1', which indicates the position in node array 110) are considered. First, the attribute(s) of the edge from the node corresponding to entry 112 to the node corresponding to entry 122 are compared to the attribute(s) (if any) of the corresponding edge (in the query graph) from the first selected query node to the second selected query node. If the two edges match, then the attribute(s) of the node corresponding to entry 122 are compared to the attribute(s) (if any) of the second selected query node from the query graph. These two comparisons are performed for each neighbor of the node corresponding to entry 112.

In some cases, a query execution engine processes a query node (of a query graph) that is connected to two or more query nodes (of the query graph) that have already been processed. For example, query node C is connected to query nodes A and B and the query execution engine has already identified, in a target graph, nodes that match query node A and nodes that match query node B. Thus, in an embodiment, identifying matches of query node C involves identifying a node that is connected to two matched nodes (i.e., nodes that matched query node A and nodes that matched query node B) and (2) matches query node C.

Each thread stores the matching nodes identified in block 270 in a separate data structure, or "thread-local array." One difference between the thread-local arrays at the second stage (and subsequent stages) and the thread-local arrays at the first stage is that the thread-local arrays at the second stage not only store the node identities of nodes identified during the matching step but also node identities of nodes identified during the first (or previous) stage. Thus, for example, if a thread is assigned nodes N1, N4, and N6 at the beginning of stage 2 and determines that nodes N2 and N10 match the second selected query node based on N1, node N7 matches the second selected query node based on N4, and no node matches the second selected query node based on N6, then that thread stores identities for N1, N2, N10, N4, and N7 in a thread-local array.

In an embodiment, the thread-local array stores node identities in the following order: N1, N2, N1, N10, N4, N7. Thus, the identity of the matched node from the first stage precedes the identity of the matched node from the second stage. If there are multiple matched nodes in the second stage based on a single matched node from the first stage (as in this example), then the identity for the single matched node from the first stage is repeated multiple times. Therefore, in this example, because there are two matched nodes in the second stage that are connected to a single matched node from the first stage, the identity of the single matched node from the first stage is stored twice in the thread-local array.

If a matched node from a previous stage (e.g., stage 1) does not have any neighbors, then that matched node is discarded when storing results of the current stage (e.g., stage 2). Similarly, if none of the neighbors of a matched node from a previous stage (e.g., stage 1) matches a query node of a current stage (e.g., stage 2), then (again), that matched node is discarded when storing results of the current stage.

Figure 3:
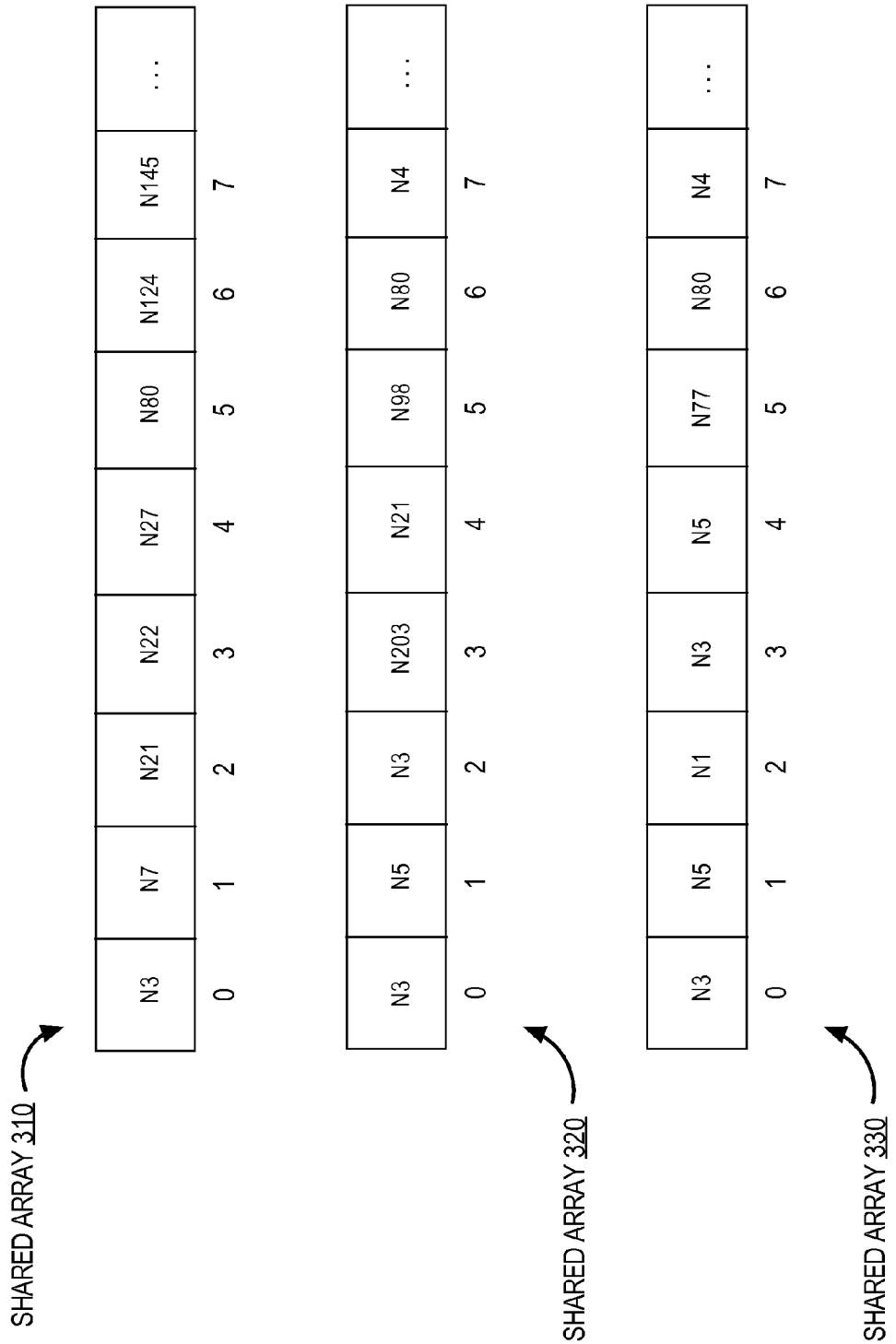
FIG. 3 is a block diagram that depicts three data structures, each storing multiple "partial" solutions to a query graph, in an embodiment.

At block 280 (similar to block 240), the node identifies in the different (thread-local) data structures are combined into a single data structure (or "shared data structure"), such as an array. FIG. 3 is a block diagram that depicts three data structures, each storing multiple "partial" solutions to a query graph, in an embodiment. Each data structure corresponds to a different stage of the first three stages of processing. Shared array 310 stores multiple partial solutions after the first stage, shared array 320 stores the multiple partial solutions after the second stage, and shared array 330 stores multiple partial solutions after the third stage.

Thus, after the first stage, the nodes in the target graph that were determined to match the first selected query node include N3, N7, N21, and so forth.

After the second stage, each set of two consecutive entries in shared array 320 corresponds to a different partial solution. For example, {N3, N5} is one partial solution after the second stage, {N3, N203} is another partial solution after the second stage, {N21, N98} is another partial solution after the second stage, and {N80, N4} is another partial solution after the second stage. Thus, nodes N5, N203, N98, and N4 were identified, during the second stage, as matching the second selected query node.

After the third stage, each set of three consecutive entries in shared array 330 corresponds to a different partial solution. For example, {N3, N5, N1} is one partial solution after the second stage, {N3, N5, N77} is another partial solution after the second stage, and {N80, N4, N33 (not shown)} is another partial solution after the second stage. Thus, nodes N1, N77, and N33 were identified, during the third stage, as matching the third selected query node.

At block 290, it is determined whether there are any more query nodes from the query graph to process. If not, then the final result of processing the query graph is reflected in the shared data structure at the end of the last performance of block 280. Else, process 200 proceeds to block 250 where the next query node from the query graph is selected and used to locate a match in the target graph.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
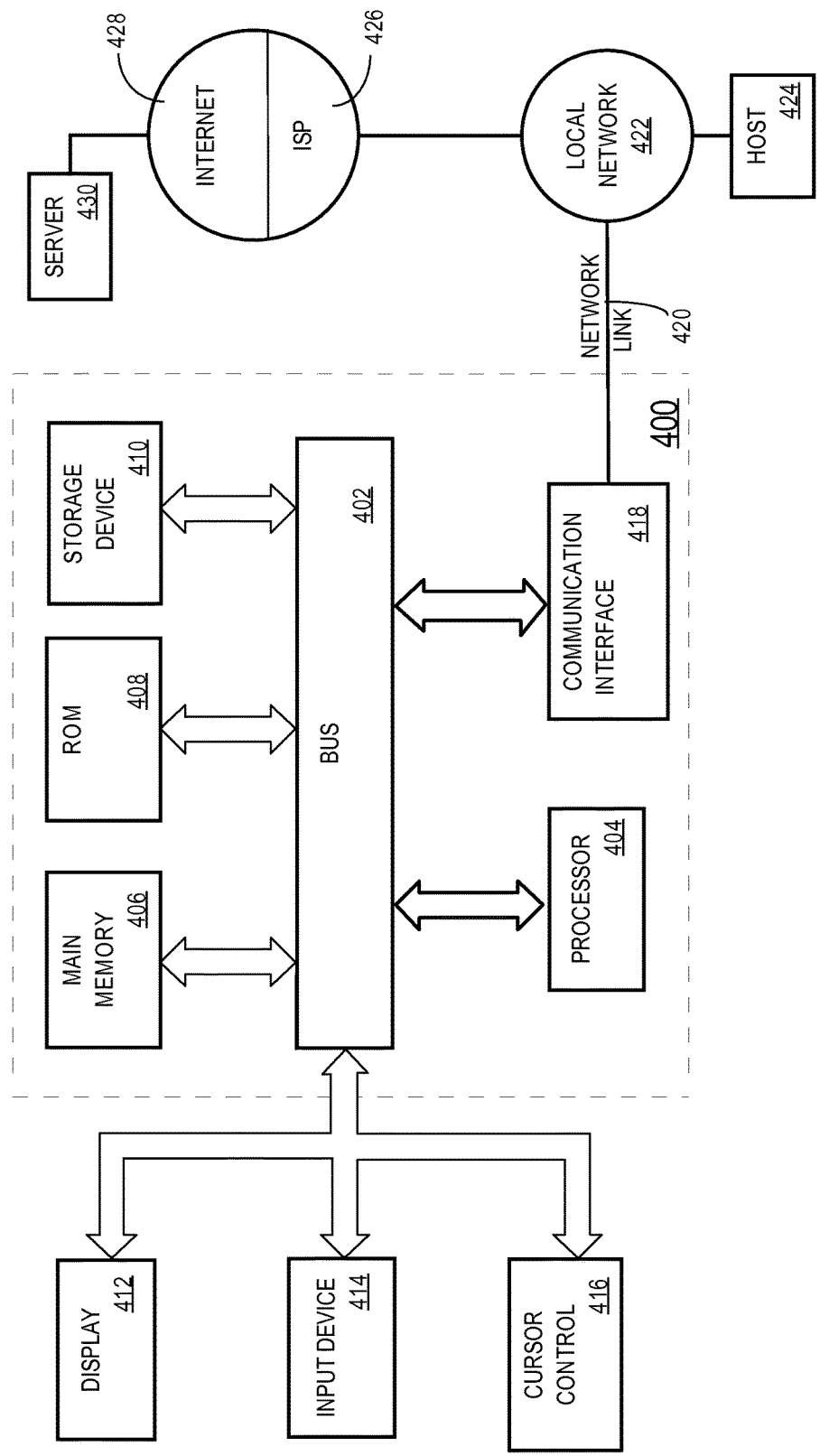
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a query graph that includes a plurality of query nodes;
   selecting a first query node from among the plurality of query nodes;
   storing a first data structure that is accessible to a first plurality of threads;
   for each thread in the first plurality of threads:
      assigning, to said each thread, a different set of nodes in a particular graph;
      identifying, in the set of nodes assigned to said each thread, one or more nodes that match the first query node;
      storing, in the first data structure, one or more node identities of the one or more nodes identified by said each thread;
   selecting, from among the plurality of query nodes, a second query node that is different than the first query node;
   storing a second data structure that is accessible to a second plurality of threads;
   for each thread in the second plurality of threads:
      assigning, to said each thread, a different set of nodes identified in the first data structure;
      identifying, in the particular graph, one or more neighbor nodes, of each node that is identified in the first data structure and is assigned to said each thread, that match the second query node;
      storing, in the second data structure, one or more identities of the one or more neighbor nodes identified by said each thread;
   wherein the method is performed by one or more computing devices.

2. The method of claim 1, further comprising:
   for each thread of the first plurality of threads:
      prior to storing the one or more node identities in the first data structure, said each thread storing the one or more node identities in a thread-local data structure that is accessible only to said each thread;
      wherein storing the one or more node identities in the first data structure comprises said each thread copying the one or more node identities from the thread-local data structure to the first data structure.

3. The method of claim 2, further comprising:
   storing order data that indicates an order among the first plurality of threads, wherein a first thread of the first plurality of threads is ordered before a second thread of the first plurality of threads;
   wherein, for the second thread, copying the one or more node identities from the thread-local data structure to the first data structure comprises:
      determining a number of node identities that are stored in a thread-local data structure of the first thread, and based on the number, identifying a position, in the first data structure, in which to store the one or more node identities identified by the second thread.

4. The method of claim 3, wherein identifying the position in the first data structure comprises identifying the position in the first data structure prior to the first thread storing, in the first data structure, the one or more node identities identified by the first thread.

5. The method of claim 2, further comprising:
   for each thread of the first plurality of threads, determining a number of node identities stored in the thread-local data structure of said each thread;
   determining a total number of node identities based on each number;
   determining a size for the first data structure based on the total number;
   generating the first data structure based on the size.

6. The method of claim 1, further comprising:
   storing the particular graph, wherein storing the particular graph comprises:
      storing a node array that identifies each node in the particular graph;
      storing a neighbor array that identifies, for each node in the particular graph, zero or more nodes that are connected to said each node;
   wherein at least one node in the particular graph is connected to multiple nodes.

7. The method of claim 6, wherein:
   storing the particular graph comprises storing a node attribute array that indicates, for each node in the particular graph, zero or more attributes or properties of said each node;
   at least one entry in the node attribute array indicates one or more attributes of a corresponding node in the particular graph.

8. The method of claim 6, wherein:
   storing the particular graph comprises storing an edge attribute array that indicates, for each edge in the particular graph, zero or more attributes or properties of said each edge;
   at least one entry in the edge attribute array indicates one or more attributes of a corresponding edge in the particular graph.

9. The method of claim 1, wherein:
   for each thread of the first plurality of threads, identifying, in the set of nodes assigned to said each thread, the one or more nodes that match the first query node comprises:
      identifying one or more attributes of the first query node,
      for each node in the set of nodes assigned to said each thread:
         identifying one or more attributes of said each node,
         comparing one or more attributes of the first query node with the one or more attributes of said each node, and
         wherein storing in the first data structure comprises storing an identity of said each node in the first data structure only if the one or more attributes of the first query node match the one or more attributes of said each node.

10. The method of claim 1, wherein:
    for each thread of the second plurality of threads, identifying, in the particular graph, the one or more neighbor nodes that match the second query node comprises:
       identifying one or more attributes of a query edge from the first query node to the second query node, for each node in the set of nodes, in the first data structure, that is assigned to said each thread:
  identifying one or more attributes of a graph edge from said each node to a second node,
  comparing one or more attributes of the query edge with the one or more attributes of the graph edge, and
  wherein storing in the second data structure comprises storing an identity of the second node in the second data structure only if the one or more attributes of the query edge match the one or more attributes of the graph edge.

11. The method of claim 10, further comprising:
for each node in the set of nodes, in the first data structure, that is assigned to said each thread:
  comparing the one or more attributes of the query edge with the one or more attributes of the graph edge prior to comparing one or more node attributes of the second query node with one or more node attributes of the second node;
  wherein comparing one or more node attributes of the second query node with one or more node attributes of the second node is only performed if the one or more attributes of the query edge match the one or more attributes of the graph edge.

12. One or more non-transitory storage media storing instructions which, when executed by one or more processors, cause:
  receiving a query graph that includes a plurality of query nodes;
  selecting a first query node from among the plurality of query nodes;
  storing a first data structure that is accessible to a first plurality of threads;
  for each thread in the first plurality of threads:
    assigning, to said each thread, a different set of nodes in a particular graph;
    identifying, in the set of nodes assigned to said each thread, one or more nodes that match the first query node;
    storing, in the first data structure, one or more node identities of the one or more nodes identified by said each thread;
  selecting, from among the plurality of query nodes, a second query node that is different than the first query node;
  storing a second data structure that is accessible to a second plurality of threads;
  for each thread in the second plurality of threads:
    assigning, to said each thread, a different set of nodes identified in the first data structure;
    identifying, in the particular graph, one or more neighbor nodes, of each node that is identified in the first data structure and is assigned to said each thread, that match the second query node;
    storing, in the second data structure, one or more identities of the one or more neighbor nodes identified by said each thread.

13. The one or more storage media of claim 12, wherein the instructions, when executed by the one or more processors, further cause:
  for each thread of the first plurality of threads:
    prior to storing the one or more node identities in the first data structure, said each thread storing the one or more node identities in a thread-local data structure that is accessible only to said each thread;
    wherein storing the one or more node identities in the first data structure comprises said each thread copying the one or more node identities from the thread-local data structure to the first data structure.

14. The one or more storage media of claim 13, wherein the instructions, when executed by the one or more processors, further cause:
  storing order data that indicates an order among the first plurality of threads, wherein a first thread of the first plurality of threads is ordered before a second thread of the first plurality of threads;
  wherein, for the second thread, copying the one or more node identities from the thread-local data structure to the first data structure comprises:
    determining a number of node identities that are stored in a thread-local data structure of the first thread, and
    based on the number, identifying a position, in the first data structure, in which to store the one or more node identities identified by the second thread.

15. The one or more storage media of claim 14, wherein identifying the position in the first data structure comprises identifying the position in the first data structure prior to the first thread storing, in the first data structure, the one or more node identities identified by the first thread.

16. The one or more storage media of claim 13, wherein the instructions, when executed by the one or more processors, further cause:
  for each thread of the first plurality of threads, determining a number of node identities stored in the thread-local data structure of said each thread;
  determining a total number of node identities based on each number;
  determining a size for the first data structure based on the total number;
  generating the first data structure based on the size.

17. The one or more storage media of claim 12, wherein the instructions, when executed by the one or more processors, further cause:
  storing the particular graph, wherein storing the particular graph comprises:
    storing a node array that identifies each node in the particular graph;
    storing a neighbor array that identifies, for each node in the particular graph, zero or more nodes that are connected to said each node;
  wherein at least one node in the particular graph is connected to multiple nodes.

18. The one or more storage media of claim 17, wherein:
  storing the particular graph comprises storing a node attribute array that indicates, for each node in the particular graph, zero or more attributes or properties of said each node;
  at least one entry in the node attribute array indicates one or more attributes of a corresponding node in the particular graph.

19. The one or more storage media of claim 17, wherein:
  storing the particular graph comprises storing an edge attribute array that indicates, for each edge in the particular graph, zero or more attributes or properties of said each edge;
  at least one entry in the edge attribute array indicates one or more attributes of a corresponding edge in the particular graph.

20. The one or more storage media of claim 12, wherein:
for each thread of the first plurality of threads, identifying, in the set of nodes assigned to said each thread, the one or more nodes that match the first query node comprises:
- identifying one or more attributes of the first query node,
- for each node in the set of nodes assigned to said each thread:
  - identifying one or more attributes of said each node,
  - comparing one or more attributes of the first query node with the one or more attributes of said each node, and
  - wherein storing in the first data structure comprises storing an identity of said each node in the first data structure only if the one or more attributes of the first query node match the one or more attributes of said each node.

21. The one or more storage media of claim 12, wherein:
for each thread of the second plurality of threads, identifying, in the particular graph, the one or more neighbor nodes that match the second query node comprises:
- identifying one or more attributes of a query edge from the first query node to the second query node,
- for each node in the set of nodes, in the first data structure, that is assigned to said each thread:
  - identifying one or more attributes of a graph edge from said each node to a second node,
  - comparing one or more attributes of the query edge with the one or more attributes of the graph edge, and
  - wherein storing in the second data structure comprises storing an identity of the second node in the second data structure only if the one or more attributes of the query edge match the one or more attributes of the graph edge.

22. The one or more storage media of claim 21, wherein the instructions, when executed by the one or more processors, further cause:
for each node in the set of nodes, in the first data structure, that is assigned to said each thread:
comparing the one or more attributes of the query edge with the one or more attributes of the graph edge prior to comparing one or more node attributes of the second query node with one or more node attributes of the second node;
wherein comparing one or more node attributes of the second query node with one or more node attributes of the second node is only performed if the one or more attributes of the query edge match the one or more attributes of the graph edge.

* * * * *